Patented July 8, 1924.

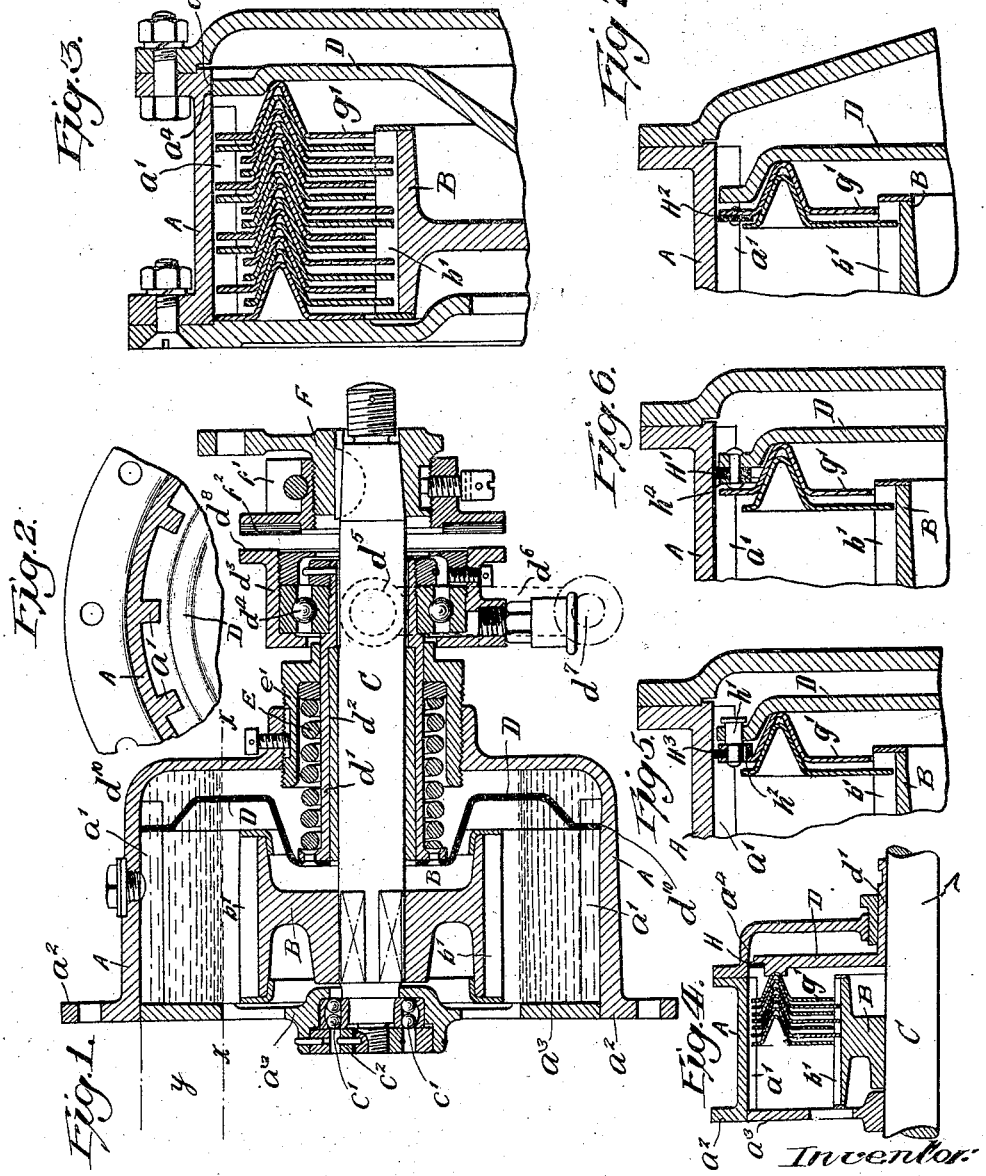

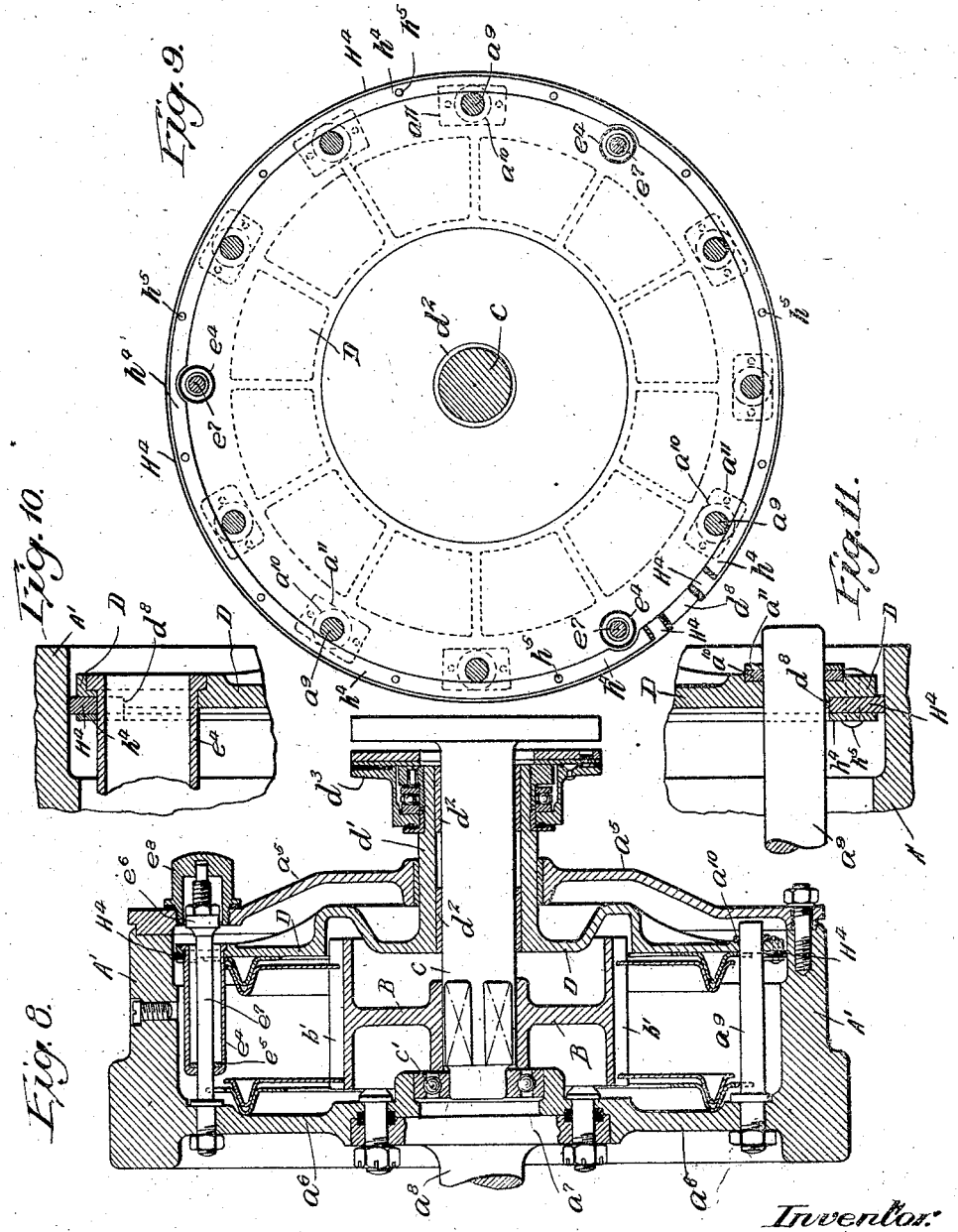

1,500,971

UNITED STATES PATENT OFFICE.

WILLIAM WALLACE, OF OLDHAM, ENGLAND.

FRICTION CLUTCH.

Application filed April 30, 1924. Serial No. 710,164.

*To all whom it may concern:*

Be it known that I, WILLIAM WALLACE, a British subject, residing in 178 Frederick Street, Oldham, in the county of Lancaster, England, have invented certain new and useful Improvements Relating to Friction Clutches, of which the following is a specification.

This invention relates to friction clutches and is particularly applicable to friction clutches for motor-car engines of that type in which the engaging surfaces, usually two series of metallic discs, are enclosed in a revolving casing containing fluid-lubricant, and in which the main presser spring acting through a presser plate normally causes the engagement of the frictional surfaces, and in which disengagement is effected by retraction of the presser plate in opposition to the said spring; and the object of the invention is to provide means adapted automatically to prevent the too sudden engagement of the friction surfaces such as takes place when the retracting pressure on the presser plate is released too rapidly say by unskilful operation of the clutch pedal.

According to the invention, the resistance to displacement of an annular band of lubricant, forced by centrifugal action against the interior of the rotating clutch casing, is utilized to ensure the gradual and even movement of the parts which effect the engagement of the frictional surfaces.

In the ordinary construction of clutches of the type herein referred to, the presser plate, when released from the retracting pressure, is free to move under the influence of its actuating spring, into the engaging position, such movement not being resisted by the displacement of the said band of lubricant; but in carrying out my invention the joint between the periphery of this plate or of a plate adapted to move with it, and the interior of the clutch casing, is made sufficiently fluid-tight to ensure the necessary and gradual resistance to displacement of the lubricant by the said movement; where the interior of the casing is provided with teeth to engage the one set of friction plates, the presser plate is indented so that it fits the said teeth throughout the whole of the circumference, the comparative fluid-tightness being sufficient to ensure the necessary resistance to displacement by leakage past these surfaces; the contact surfaces may, however, be cylindrical, and one of them may be a packing ring of leather or the like material. As the resistance to displacement depends upon the comparative fluid-tightness of the joint, this may be varied to give the desired resistance, definite and adjustable leakage passage-ways being provided in some cases.

As the speed of rotation of the driven parts is usually decreased as the clutch engages, the centrifugal force is reduced, and the resistance to displacement of the band of lubricant, by increasing the radial depth of the band thereof, decreases, so that the lubricant may in part be displaced by this radial movement, and the parts may be so proportioned that this radial movement increases the lubricating action.

I have illustrated my invention by way of example in the accompanying drawings, in which:—

Figs. 1 and 2 show a motor-car clutch of the preferred form, in which the comparatively fluid-tight joint is made directly between the periphery of the presser plate and the interior of the casing.

Fig. 1 being a side elevation in medial section, and,

Fig. 2 a fragmentary end elevation in transverse section on the line II, II of Fig. 1.

Fig. 3 which shows a modification of the arrangement of Figs. 1 and 2, is a fragmentary side elevation in medial section.

Figs. 4, 5, 6 and 7 are diagrammatic views, similar to Fig. 3; Figs. 4 to 6 show modifications in which the comparatively fluid-tight joint is made between the casing and a packing ring carried by the presser plate; and Fig. 7 shows the packing ring fitted to one of the friction plates.

Figs. 8 to 11 show the preferred construction when the presser plate is fitted with a packing ring.

Fig. 8 being a side elevation in medial section.

Fig. 9 a face view of the presser plate with the spring tubes in section, and

Figs. 10 and 11 enlarged fragmentary views of details.

Referring first to Figs. 1 and 2; A is the clutch casing, the interior of which is provided with a series of teeth $a^1$ with which the indented peripheries of the driving metallic friction plates engage; the casing A usually forms the driving element of the clutch combination, and in the case of a motor car clutch, is attached by the facing $a^2$ to the engine fly-wheel which completely encloses the interior of the casing.

B is the driven element which takes the form of a boss rigidly secured to the driven shaft C, the free end of which shaft is journalled in the ball bearing $c^1$ carried in the end plate $a^3$ which maintains the bearing $c^2$ and shaft C in concentric relationship with the driving element. The exterior of the boss B is provided with a series of teeth $b^1$ which engage with the indented bores of the driven metallic friction plates. The friction plates, which are not shown in Figs. 1 and 2, may be plain discs of any suitable type arranged in the usual manner in two alternately disposed groups, the one group engaging with the casing A and being clear of the boss B, and the other engaging with the latter and being clear of the former; but we find that the well known Hele-Shaw T-shaped friction plates, as shown in Figs. 3 to 8 are admirably suited for use in connection with the present invention.

D is the presser plate mounted on the sleeve $d^1$ which is provided with a liner $d^2$ and is adapted to slide on the shaft C. The presser plate is, normally, pressed axially, by a spring E, so as to transmit through the frictional plates the necessary pressure to ensure their friction engagement to transmit the desired torque from driving to driven element. The spring E, in the construction illustrated, is located in the spring box $e^1$ which screws into a boss on the end of the casing and may therefore be initially adjusted to give the desired degree of compression to the spring. To de-clutch, the pressure-plate is retracted by any convenient pedal controlled means. In the example illustrated the pressure-plate sleeve $d^1$ is provided at its outer end with a non-rotational pedal-operated bushing $d^3$ which is journalled on the sleeve $d^1$ by the ball bearing $d^4$. This bushing is fitted with a pair of diametrally disposed pivot pins $d^5$ with which the ends of a bow-shaped lever $d^6$ (shown in chain dotted lines) engages, the lever being mounted on the pedal shaft $d^7$.

F is a coupling, keyed to the shaft C, by which the latter is coupled to the gear to be driven; $f^1$ is a brake block the screwed bore of which fits the coupling F and which can be adjusted axially relatively thereto. On de-clutching the fibre disc $f^2$ engages with the rotationally fixed facing $d^8$ of the bushing $d^3$ and the frictional engagement serves to bring the shaft C to rest.

In the ordinary construction of clutches of the type described the periphery of the presser-plate D does not fit the interior periphery of the clutch casing A in such manner as to make a comparatively fluid-tight joint, but according to the present invention as applied to the type of clutch described, the indented peripheral surface $d^{10}$ of the presser-plate D, and the toothed interior surface of the clutch casing A are so fitted together that whilst relative axial movement between these surfaces is permitted, the fit between them is sufficiently fluid-tight to retard the axial flow of oil between them from one side of the presser-plate to the other, when, upon the release of the bushing $d^3$, the spring E tends to push the presser-plate into contact with the friction plates. When this action takes place, the casing is rotating and the oil contained therein will, by virtue of centrifugal force, occupy an annular belt indicated by the dotted lines in Fig. 1 bounded by the outer parts of the interior of the clutch casing and by the cylindrical surface $x, x$. Any movement of the presser-plate to the left (under the action of spring E when the bushing $d^3$ is released) if there be no substantial leakage of oil between the peripheral surfaces of the plate and the casing, must displace the oil on the left side of the presser-plate so as to increase the radial dimension $y$ of the oil belt by an amount corresponding with the amount of reduction of the axial dimension of the belt, and as such displacement must be made in opposition to the pressure due to the centrifugal force acting on the oil, the said movement due to the spring will be an easy and gradual one since it is controlled by the fluid resistence, and the degree of resistance may be adjusted, if necessary, by adjusting the extent of leakage past the peripheral surfaces of the presser-plate and the casing, or by providing an adjustable leakage passage.

As stated, in the construction illustrated in Figs. 1 and 2, the toothed inner surface of the casing and the corresponding surface $d^{10}$ of the presser-plate are by machining made a sufficiently good fit to ensure the necessary degree of fluid tightness. In some cases, however, the periphery of the presser-plate may be made of truly cylindrical configuration as shown at $d^9$ Fig. 3, and fit a corresponding cylindrical part $a^4$ of the interior of the casing A, in which case the degree of fluid-tightness of the joint may be more easily determined; in such cases the rotation of the presser-plate relatively to the casing must be prevented, say by attaching it to the end friction disc $g^1$.

In some cases the presser-plate D may be fitted with a packing ring H (see Fig. 4) of leather, fibre or the like, the surface of the ring, which in Fig. 4 is cylindrical, fitting the cylindrical bore $a^4$ of the casing.

Or, as shown in Fig. 6, the ring $H^1$ and the periphery of the presser-plate may be shaped to fit the teeth $a^1$ of the casing, the packing ring being compressed by the ring $h^4$ riveted to the presser-plate.

In some cases the ring $H^2$ (see Fig. 7) may be attached to one of the friction discs $g^1$, or several such rings may be fitted one to each of several friction discs.

Where there is much leakage past the packing ring it may be attached to the presser-plate so as to be axially movable relatively thereto, as shown in Fig. 5 where the ring $H^3$ is attached to the presser-plate D by studs $h^1$. When the presser-plate is drawn back, as shown in Fig. 5 any oil which may have escaped to the right past the ring $H^3$ can find its way back through ports such as $h^2$ which are covered by the face of the presser-plate D when the latter is pressing the friction plates together.

The preferred construction, when the presser-plate is fitted with a plain packing ring fitting a cylindrical part of the interior of the casing, is that shown in Figs. 8 to 11.

In this modification the casing $A'$ is closed by an end cover plate $a^5$ and the ball bearing $c^1$ is carried on the bore of the opposite end $a^6$, and the flange $a^7$ of the driving shaft $a^8$ is bolted to the said end $a^6$. Instead of teeth integral with the casing, to connect the driving friction discs $g^1$ to the casing, a series of studs $a^9$, attached to the casing, are provided for this purpose, and these studs pass through the presser-plate D and drive it, flow of oil through the holes in the presser-plate to take these studs being prevented by leather or the like packing rings $a^{10}$ fitting the studs and being held in compression by the plates $a^{11}$ screwed to the presser-plate.

In this modification instead of a single central spring to actuate the presser-plate, as in Figs. 1 and 2, three springs located in spring-tubes $e^4$ carried by the presser-plate are employed for this purpose; the springs at one end bearing against leather washers $e^5$ at the bottoms of the respective spring-tubes, the other ends of the springs bearing on adjustable nuts $e^6$ carried on studs $e^7$ attached to the casing A and passing through the spring-tubes; access to these nuts being obtained by removal of the caps $e^8$.

The presser-plate sleeve is mounted on the shaft C by bushes $d^2$ and is provided with a non-rotational pedal operated bushing $d^3$ which is similar in construction and action to that described in reference to Figs. 1 and 2.

The presser-plate is recessed, see $d^8$ Figs. 10 and 11, to take the packing ring $H^4$, and the latter is held in place and compressed by a metal ring $h^4$ secured to the presser ring by the screws or rivets $h^5$.

The rings $H^4$ and $h^4$ are recessed to take the spring-tubes $e^4$.

In the drawings, the respective surfaces between which the joints are made, are shown in contact, as the degree of clearance necessary to give the desired retarding effect is too small to be shown clearly.

Obviously the details of construction may be varied to suit different types of clutches.

Having now particularly described my invention I declare that what I claim and desire to secure by Letters Patent is:

1. A method of modifying the action of a clutch which includes the step of opposing the centrifugal force of a rotating body of lubricant by changing its bodily dimensions.

2. In combination a clutch casing, a presser plate movable coaxially with and within said casing, clutch discs movable by said presser plate, and a packing means carried by a clutch disc and engaging the casing.

3. In combination, a clutch casing, a presser plate movable coaxially with and within said casing, clutch discs movable by said presser plate, and a packing means carried by a clutch disc and engaging the casing, said packing means being also attached to the presser plate and movable relatively thereto.

In witness whereof I have hereunto set my hand in the presence of two subscribing witnesses.

WILLIAM WALLACE.

Witnesses:
WILLIAM LENNON,
JOHN WILLIAM THOMAS.